(No Model.)
A. SCHERRER.
ICE VELOCIPEDE.
No. 588,485. Patented Aug. 17, 1897.
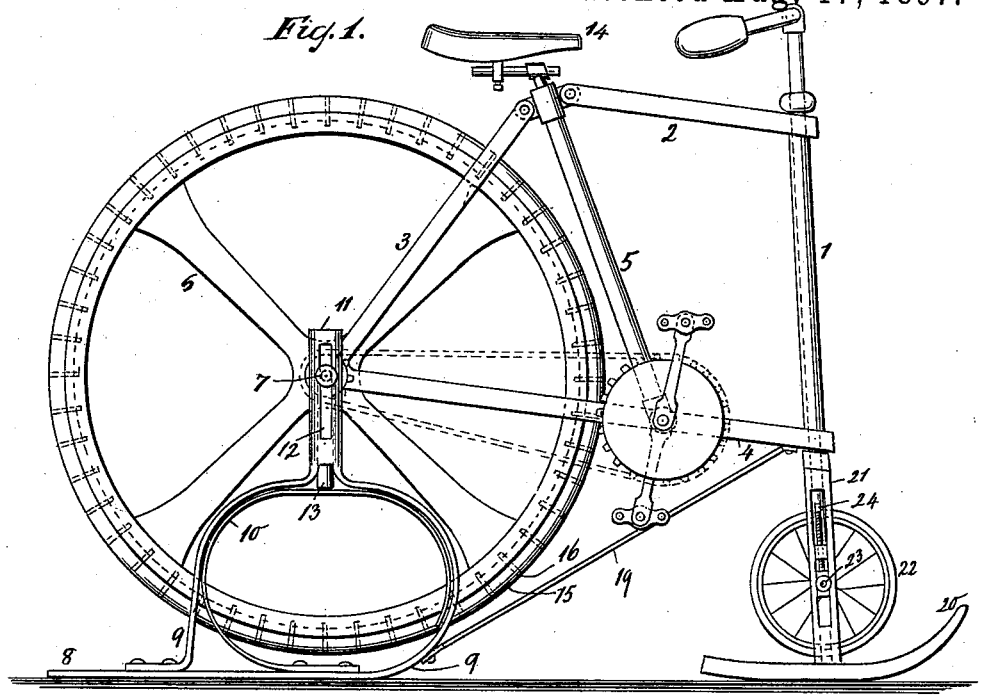
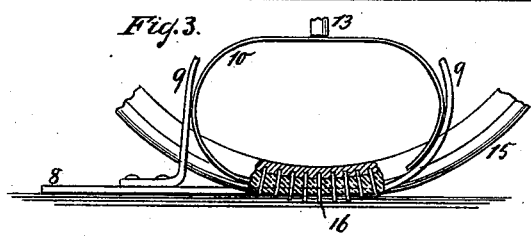
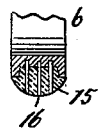
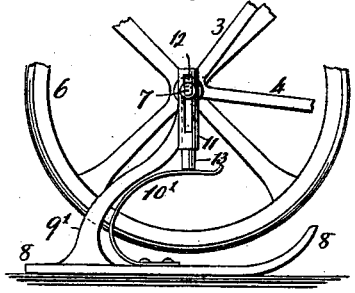
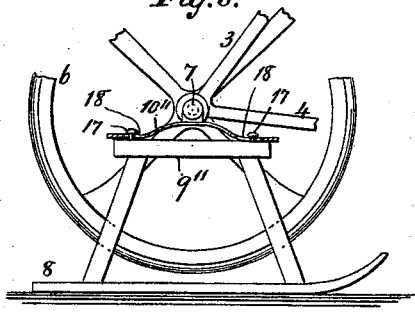
WITNESSES:
E. Wolff
Chas. E. Preussner
INVENTOR
Adolphe Scherrer.
BY
Hauff & Hauff
ATTORNEYS.

UNITED STATES PATENT OFFICE.

ADOLPHE SCHERRER, OF NEW YORK, N. Y.

ICE-VELOCIPEDE.

SPECIFICATION forming part of Letters Patent No. 588,485, dated August 17, 1897.

Application filed October 10, 1896. Serial No. 608,504. (No model.)

*To all whom it may concern:*

Be it known that I, ADOLPHE SCHERRER, a citizen of Alsace, residing at New York, in the county and State of New York, have invented new and useful Improvements in Velocipedes, of which the following is a specification.

This invention relates to velocipedes capable of being propelled over ice or snow, and by means of this invention the construction of such velocipede is made simple and easy, as set forth in the following specification and claims, and illustrated in the annexed drawings, in which—

Figure 1 is a side elevation of the velocipede. Fig. 2 is a transverse section of a tire. Fig. 3 is a detail side view of parts of Fig. 1, partly broken away and sectioned. Fig. 4 is a side elevation of a modification. Fig. 5 is a side elevation of another modification.

A velocipede-frame 1 2 3 4 5 is provided with a driving-wheel 6, the axle of which is indicated at 7. A runner or runners 8 have each a frame or support 9. It is understood that a runner 8 is on each side of wheel 6, but a description of the parts of one runner applies to both.

At the interior or under side of the frame or supporting portion 9 is a flat spring 10. The frame 9 carries a sleeve or guide 11, slotted, as shown at 12, and a stem 13, movable in guide 11, is supported by spring 10. The driving-wheel has its axle 7 extended through the slot 12 and supported by the stem 13. The spring 10 normally tends to keep the wheel 6 free or out of contact with the ground, but the weight of a rider on saddle 14 when compressing spring 10 a sufficient extent will cause the wheel 6 to grip or bring its rim or tire 15 into propelling contact.

The tire 15 is shown compressible, as when made of soft rubber, and the wheel 6 has points or prongs 16 normally flush with the outer edge or face of the tire, as seen in Fig. 2, but when the tire is compressed, as seen in Fig. 3, the prongs 16 will protrude to pierce or obtain a grip in the ice or snow or other supporting-surface.

This device enables well-known flat carriage-springs or carriage-spring material to be used for the springs 10, thus making the construction easy and convenient.

Of course the device can be modified without departing from the invention—as, for example, in Fig. 4, where the shape of the frame and of the spring are varied from those of Fig. 1, as shown by the frame or arm 9' and the spring 10' of Fig. 4. In Fig. 5 the frame 9" is shown with a flat bow spring 10", movably or compressibly secured, as by pin-and-slot connection 17 and 18, to the frame 9". The runner 8 or frame 9 is shown steadied by brace 19. The front runner 20 is connected to the steering-fork 21, and this fork 21 also has a wheel 22, the axle 23 of which is journaled in a box capable of being set by a screw 24. In case it is desired to have the front runner 20 off the ground the wheel 22 can be lowered to supporting position, so that the front part of the vehicle will run on such wheel 22 instead of on runner 20.

What I claim as new, and desire to secure by Letters Patent, is—

1. A velocipede-frame having a driving-wheel and a runner provided with a frame or supporting portion, a flat spring at the interior of the frame, a slotted guide or sleeve carried by the frame, and a stem movable in said guide and supported by the spring, said driving-wheel having its axle extended through the slot of the guide and supported by the stem substantially as described.

2. A velocipede-frame having a driving-wheel and a runner having a flat spring made to support the axle of the wheel, said driving-wheel having a compressible tire and points or prongs extended through and normally flush with the outer edge of the tire substantially as described.

3. A velocipede-frame having a driving-wheel, runners at the back and front of the velocipede, a spring carried by the rear runner and made to support the driving-wheel, and a front wheel made adjustable for raising the front runner off the ground substantially as described.

In testimony whereof I have hereunto set my hand in the presence of two subscribing witnesses.

ADOLPHE SCHERRER.

Witnesses:
WM. C. HAUFF,
E. F. KASTENHUBER.